No. 747,255. Patented December 15, 1903.

UNITED STATES PATENT OFFICE.

FRANCIS MUDIE SPENCE, DAVID DICK SPENCE, ARTHUR SHEARER, AND THOMAS JOHN IRELAND CRAIG, OF MANCHESTER, ENGLAND, ASSIGNORS TO PETER SPENCE & SONS, LIMITED, OF MANCHESTER, ENGLAND.

PROCESS OF MAKING CHROMATES OF THE ALKALINE METALS.

SPECIFICATION forming part of Letters Patent No. 747,255, dated December 15, 1903.

Application filed June 29, 1900. Renewed October 20, 1903. Serial No. 177,812. (No Specimens.)

*To all whom it may concern:*

Be it known that we, FRANCIS MUDIE SPENCE, DAVID DICK SPENCE, ARTHUR SHEARER, and THOMAS JOHN IRELAND CRAIG, subjects of the Queen of Great Britain and Ireland, residing at Manchester, in the county of Lancaster, England, have invented new and useful Improvements in Processes of Making Chromates of the Alkaline Metals, of which the following is a specification.

This invention relates to the manufacture or production of such of the bichromates of the alkaline metals as may be commercially used in mordanting, dyeing, and tanning processes, in the manufacture of dyestuffs and pigments, and the like. The materials available for the manufacture are those containing chromium, sodium or potassium, and calcium; but since the object of our invention is to cheapen production and material containing sodium as the alkaline-metal component is cheaper than that containing potassium we will describe our invention with reference to sodium only, it being understood that if potassium bichromate be required it will be necessary to use an equivalent molecular proportion of a potassium component in substitution for the sodium material.

Briefly, our improvements consist in first preparing a mixture having the three named components, of which the first may be a chrome ore, the second sodium, as a hydrate or carbonate, and the third calcium, as an oxid, hydrate, or carbonate, and exposing it to a high temperature in a suitable furnace. The frit thus produced after mixture with water is treated with carbon dioxid and ammonia, and the resulting solution after separation from the insoluble residue is also treated with carbon dioxid and ammonia. The precipitate now formed having been separated, the solution is evaporated, its evolved ammonia recovered, and it is separated from the precipitate which is produced by the evaporation. This last precipitate is treated for the recovery of the chromic acid therein, while the clear solution is further evaporated, the resulting product being the desired bichromate.

In carrying out our invention we may proceed as follows: The hereinbefore-named components containing chromium, sodium, (or potassium,) and calcium are mixed in such proportions that after the furnacing operation there shall be contained in the frit, first, sufficient sodium or potassium to theoretically yield monochromate with about one-half of the chromic acid extractable by this process, and, second, a large excess of lime beyond that which is theoretically required to form calcium monochromate, with the remainder of the chromic acid extractable by the process. If the chrome ore, for example, contains about fifty per cent. of chromic oxid, ($Cr_2O_3$,) and it is found that our process will extract ninety per cent. of it, then for every one hundred kilos of such ore we may use about thirty-two kilos of sodium carbonate containing about fifty-eight per cent. of alkali and about ninety kilos of lime, (CaO,) which should be slaked before use. With this excess of lime we obtain a frit which is in a desirable open, friable, and crumbly condition. The given proportion of soda should be increased to compensate for losses of that material through volatilization and through some of it being rendered unavailable because of its combination with sulfuric acid, for example. The mixture is heated in a suitable furnace at the usual high temperature employed in heating or calcining chrome ores in the presence of atmospheric oxygen and in the condition of fine powder until as much as is practicable of the contained chromium is oxidized to chromic acid and has entered into combination with bases. The cooled frit is by known means reduced to a state of fine division, and water is added to bring it into the condition of a slurry or cream. It is then introduced into a carbonator, in which carbon-dioxid gas and gaseous or aqueous ammonia or ammonium carbonate can be passed into it. Any well-known suitable means for agitating or stirring the mixture in the carbonator may be provided for use in case the current of carbon dioxid through the mixture should not suffice to insure its continued homogeneity. It is known to chemists that the carbon dioxid may be derived from lime-kiln gases, which may be purified before passing into the carbonator.

The carbonation and ammoniation are continued until practically all the extractable chromic acid has been brought into solution in combination with soda, ammonia, and lime. At this stage the process should be arrested if magnesia be present, as otherwise this material would next be brought into solution and would during the final concentration be precipitated in combination with chromic acid.

It is well known that magnesia is commonly present in the chromium and calcium compounds used in the preparation of the frit, and it is also known that should any of it have come into solution it may be readily precipitated by the addition of calcium hydrate.

We find that it is unnecessary to add a sufficiency of ammonia to theoretically convert one-half of the extractable chromic acid into ammonium monochromate, as apparently a considerable proportion of the chromic acid appears to be liberated by the action of the carbon dioxid on the calcium chromate and then to combine with the sodium chromate, forming sodium bichromate.

Instead of using a single carbonator we may adopt the arrangement, often employed, of two carbonators in tandem, with the advantages that the pressure in the temporarily leading carbonator is thus increased, thereby promoting the absorption of the carbon dioxid, and that the loss of the carbon dioxid is diminished. With this arrangement, calling one of the carbonators "No. 1" and the other "No. 2," when the action in No. 1, which is temporarily the first receiving the carbon dioxid, is completed it is emptied and charged with fresh material. The supply of gas is now reversed and goes first to No. 2 and thence to No. 1, the change being repeated as often as desired. The carbonation and ammoniation give an efficient result at ordinary temperatures. The reaction tends, however, to raise the temperature of the mixture, and thus to volatilize some of the ammonia. This tendency may be neutralized by flowing cold water over the surface of the carbonator or by other known means. The cooling, however, is not essential, since the reaction takes place also at increased temperatures. It is obvious, however, that the higher the temperature the greater the tendency to volatilize ammonia, and consequently the greater the necessity to introduce additional ammonia. The ammonia in the waste gases may be recovered by known means—as, for example, by passing the gases through sulfuric acid, when it is recovered as ammonium sulfate.

The material taken from the carbonators after the completion of the reaction has its insoluble portion separated by well-known means, the known precaution being taken to expose to the air as little as possible any liquors containing volatile ammonia. The clear solution thus obtained which contains chromic acid in combination with soda ammonia and lime is transferred to a carbonator which, as in the carbonation and ammoniation of the frit, may be one of a tandem pair where it is acted on by carbon dioxid and ammonia together or by carbon dioxid and ammonium carbonate together until the lime present has been precipitated. This precipitate is then separated from the solution, which now contains chomic acid in combination with soda and ammonia.

If the frit is free from magnesia, the second carbonation and ammoniation last described may be dispensed with. In this case the carbonation and ammoniation of the frit is continued until all or practically all the lime has been precipitated as carbonate and all or practically all of the extractable chromic acid has been brought into solution in combination with soda and ammonia. The separated clear solution, whether obtained by the double or by the single stage carbonation and ammoniation process is evaporated by heat in a closed vessel to drive off the ammonia, which is recovered by known means. This expulsion of the ammonia causes the formation of sodium bichromate. The evaporation is continued until the solution at or near its boiling-point has a density of 1.6 specific gravity or thereabout. Any insoluble matters which may have been produced during this part of the process may be separated by well-known suitable means. Owing to the presence of sulfur compounds in the fuel-gases and lime-kiln gases when the latter are used, the solution usually contains a small proportion of sodium sulfate, most of which is thrown down during the concentration to 1.6 specific gravity. Should it be desired to throw down a still larger proportion of this salt, the concentration may be carried to a still higher point. After the separation of the last-mentioned insoluble matter the subsequent treatment of which for the extraction of any chronic acid which it may contain is hereinafter described the clear solution may be at once transferred to a second closed evaporator, where it is further concentrated. During this further evaporation, in which nearly all the remaining ammonia is expelled, the solution passes its saturation-point and some bichromate salts out. The evaporation is therefore not to be continued beyond the point at which the continually-agitated mixture of liquid and salts may be readily withdrawn from the vessel. The mixed liquid and salts from the preceding evaporator are transferred to a final evaporator, in which the salts can be prevented from caking on the bottom or sides by manual or mechanical scrapers or by other equivalent means, as is well understood. This final evaporation is carried to such a point as may be desired—that is to say, according as it may be required to produce crystals or cake.

The insoluble matter which was separated from the solution at the end of the first evaporation may be mixed with water, and then finely-divided calcium hydrate is added in sufficient quantity to precipitate any magnesia which may be present. Calcium chromate is thus obtained in solution, and after its separation from the precipitate it may be added to one of the carbonating vessels. If a sufficient quantity of chromate is carried down with the precipitate to make it worth while to do so, the precipitate may be dried and utilized in the production of frit for a further operation, or the insoluble matter produced in the first evaporation instead of being mixed with water and treated with lime may be dried and itself be used in the production of frit.

The ammonia volatilized during evaporation and recovered by well-known suitable means may be again utilized for the carbonation and ammoniation process, and the calcium carbonate precipitated in the second carbonating and ammoniating stage may be dried and used in the production of frit.

If a mixture of monochromate and bichromate be desired, this may be obtained by using a proportionately larger quantity of soda than that specified. An acid product may be obtained if a proportionately smaller quantity of soda be used than that specified.

The practice which is sometimes adopted in the manufacture of bichromates of the alkaline metals of replacing the hereinbefore-specified alkaline-metal component by a corresponding sulfate may be adopted with our process; but the reduction of cost thus obtained in the materials is to some extent balanced by the less complete oxidation of the chromium into chromic acid.

Having now particularly described and ascertained the nature of our said invention and in what manner the same is to be performed, we declare that what we claim is—

1. The process for the production of bichromates of the alkali metals, which consists in mixing together and calcining chrome ore, calcium oxid and an alkali-metal carbonate in such proportions that there shall be in the calcined mixture one molecule of alkali-metal monoxid and at least one molecule of calcium monoxid for every two molecules of chromic acid experimentally found to be extractable in a soluble form by the process; reducing the resulting frit to a fine powder and suspending it in water; passing carbon dioxid and ammonia into the mixture until all the extractable chromic acid has been brought into solution as alkali-metal chromate, calcium chromate and ammonium chromate, but short of the point at which any magnesium if present begins to dissolve; separating the solution from undissolved and precipitated matter; passing carbon dioxid and ammonia into the solution; separating the resulting solution from the formed precipitate; boiling the separated solution to drive off the ammonia, and evaporating the residual solution so as to obtain the alkali-metal bichromate in the desired condition.

2. The process for the production of bichromates of the alkali metals which consists in mixing together and calcining chrome ore, calcium oxid and an alkali-metal carbonate in such proportions that there shall be in the calcined mixture one molecule of alkali-metal monoxid and at least one molecule of calcium monoxid for every two molecules of chromic acid experimentally found to be extractable in a soluble form by the process; reducing the resulting frit to a fine powder and suspending it in water; passing carbon dioxid and ammonia into the mixture until all the extractable chromic acid has been brought into solution as alkali-metal chromate and ammonium chromate; separating the solution from undissolved and precipitated matters; boiling the separated solution to drive off the ammonia, and evaporating the residual solution so as to obtain the alkali-metal bichromate in the desired condition.

3. In the process for the production of bichromates of the alkali metals, mixing together and calcining chrome ore, calcium oxid and an alkali-metal carbonate in such proportions that there shall be in the calcined mixture one molecule of alkali-metal monoxid and at least one molecule of calcium monoxid for every two molecules of chromic acid experimentally found to be extractable in a soluble form by the process; reducing the resulting frit to a fine powder and suspending it in water; passing carbon dioxid and ammonia into the mixture until all the extractable chromic acid has been brought into solution as alkali-metal chromate and ammonium chromate, and separating the undissolved and precipitated matters and thus obtaining as an intermediate product a solution containing ammonium chromate and an alkali-metal chromate.

In testimony whereof we have signed our names to this specification in the presence of two subscribing witnesses.

FRANCIS MUDIE SPENCE.
 DAVID DICK SPENCE.
 ARTHUR SHEARER.
 THOMAS JOHN IRELAND CRAIG.

Witnesses:
 WILLIAM C. KEYS,
 JAS. STEWART BROADFOOT.